(12) United States Patent
Park et al.

(10) Patent No.: US 11,664,688 B2
(45) Date of Patent: *May 30, 2023

(54) APPARATUS AND METHOD FOR PERFORMING POWER CALIBRATION IN WIRELESS POWER TRANSMISSION SYSTEM

(71) Applicant: LG ELECTRONICS INC., Seoul (KR)

(72) Inventors: Yongcheol Park, Seoul (KR); Joonho Park, Seoul (KR); Gyunghwan Yook, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,884

(22) Filed: Oct. 4, 2021

(65) Prior Publication Data

US 2022/0029475 A1    Jan. 27, 2022

Related U.S. Application Data

(63) Continuation of application No. 16/961,554, filed as application No. PCT/KR2019/000251 on Jan. 8, 2019, now Pat. No. 11,139,702.

(Continued)

(51) Int. Cl.
*H02J 50/80* (2016.01)
*H02J 50/12* (2016.01)
*H02J 50/40* (2016.01)

(52) U.S. Cl.
CPC ............. *H02J 50/80* (2016.02); *H02J 50/12* (2016.02); *H02J 50/40* (2016.02)

(58) Field of Classification Search
CPC ............. H02J 50/80; H02J 50/12; H02J 50/40
See application file for complete search history.

(56) References Cited

U.S. PATENT DOCUMENTS 11,139,702 B2 * 10/2021 Park .................... H02J 50/12
2015/0263532 A1    9/2015 Wageningen
(Continued)

FOREIGN PATENT DOCUMENTS

| CN | 103427498 | 12/2013 |
| CN | 104704710 | 6/2015 |

(Continued)

OTHER PUBLICATIONS

European Patent Office Application Serial No. 19738512.3, Search Report dated Jan. 22, 2021, 12 pages.

(Continued)

*Primary Examiner* — Robert L Deberadinis
(74) *Attorney, Agent, or Firm* — Lee Hong Degerman Kang & Waimey

(57) ABSTRACT

The present invention relates to an apparatus and a method for performing power calibration in a wireless power transmission system. The present specification provides a wireless power transmission apparatus comprising: a power conversion unit configured to transmit, in a power transfer phase, wireless power generated on the basis of magnetic coupling to a wireless power receiving device; and a communication/control unit configured to perform an initial calibration for a power parameter prior to the power transfer phase, receive a first received power packet from the wireless power receiving device indicating the power received by the wireless power receiving device during the power transfer phase, and detect foreign matter by using the received power and a first power loss determined on the basis of the initial calibration. It is possible to adaptively respond to a newly changed wireless charging environment (Continued)

to calibrate transmission power and reception power, and it is possible to detect foreign matter more precisely by detecting a power loss on the basis of the calibrated transmission and reception power.

13 Claims, 20 Drawing Sheets

Related U.S. Application Data

(60) Provisional application No. 62/615,445, filed on Jan. 10, 2018.

(56) References Cited

U.S. PATENT DOCUMENTS

| | | |
|---|---|---|
| 2017/0093214 A1 | 3/2017 | Watanabe et al. |
| 2019/0131826 A1 | 5/2019 | Park et al. |
| 2021/0066973 A1 | 3/2021 | Park et al. |

FOREIGN PATENT DOCUMENTS

| | | |
|---|---|---|
| CN | 105359373 | 2/2016 |
| CN | 106464036 | 2/2017 |
| EP | 3457527 | 3/2019 |
| JP | 2015165761 | 9/2015 |
| KR | 101213649 | 12/2012 |
| KR | 20150059069 | 5/2015 |
| KR | 20170118571 | 10/2017 |
| KR | 20170140685 | 12/2017 |
| WO | 2017136852 | 8/2017 |
| WO | 2017-179826 | 10/2017 |
| WO | 2017213428 | 12/2017 |

OTHER PUBLICATIONS

IEC, "The Qi wireless power transfer system power class 0 specification—Parts 1 and 2: Interface Definitions," IEC PAS 63095-1 Edition 1.0(XP082011518), May 2017, 164 pages.
European Patent Office Application Serial No. 22151372.4, Search Report dated May 2, 2022, 11 pages.
PCT International Application No. PCT/KR2019/000251, International Search Report dated Apr. 18, 2019, 2 pages.
European Patent Office Application Serial No. 22151372.4, Office Action dated Jan. 26, 2023, 6 pages.
The State Intellectual Property Office of the People's Republic of China Application Serial No. 201980012518.8, Notice of Allowance dated Jan. 9, 2023, 5 pages.

\* cited by examiner

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 13

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | Reserved | | | | | Mode | | |
| $B_1$ | (MSB) | Received Power Value | | | | | | |
| $B_2$ |  | | | | | | | (LSB) |

FIG. 19

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | End Power Transfer Code (0x0C) |

APPARATUS AND METHOD FOR PERFORMING POWER CALIBRATION IN WIRELESS POWER TRANSMISSION SYSTEM

CROSS-REFERENCE TO RELATED APPLICATION(S)

This application is a continuation of U.S. patent application Ser. No. 16/961,554, filed on Jul. 10, 2020, patented, now U.S. Pat. No. 11,139,702, which is the National Stage filing under 35 U.S.C. 371 of International Application No. PCT/KR2019/000251, filed on Jan. 8, 2019, which claims the benefit of U.S. Provisional Application No. 62/615,445, filed on Jan. 10, 2018, the contents of which are all hereby incorporated by reference herein in their entireties.

TECHNICAL FIELD

The present disclosure relates to wireless charging, and more particularly, to an apparatus and method for performing power calibration in a wireless power transfer system.

BACKGROUND ART

The wireless power transfer (or transmission) technology corresponds to a technology that can wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transmission system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

A wireless power transmitter and a wireless power receiver include various circuit components provided therein and are constituted as independent devices from each other, but since the wireless power transfer is performed by magnetically coupling between the wireless power transmitter and the wireless power receiver, the wireless power transmitter and the wireless power receiver constitute one wireless power transfer system. However, an error may occur between the transmitted power and received power due to a change in the magnetic coupling according to the actual use environment (signal size, frequency, and duty cycle applied to the wireless power transfer system, distance/position alignment between Tx and the Rx, and the like) of Tx and Rx as well as unique physical characteristics of the wireless power transfer system. The error may be an obstacle to a sophisticated detection of foreign object.

Therefore, there is a need for a method of calibrating transmitted power and received power by reflecting the unique characteristics of the wireless power transfer system and the change in the actual use environment, and performing more sophisticated FOD based on the calibrated transmitted power and received power.

DISCLOSURE

Technical Problem

The technical problem of the present disclosure is to provide an apparatus and method for performing power calibration in a wireless power transfer system.

Another technical problem of the present disclosure is to provide an apparatus and method for adaptively performing power calibration in response to a change in load and performing a detection of foreign object.

Still another technical problem of the present disclosure is to provide an apparatus and method for adaptively performing power calibration in response to a change in magnetic coupling between a wireless power transmitter and a wireless power receiver, and performing a detection of foreign objects.

Technical Solution

According to an aspect of the present disclosure, there is provided a wireless power transmitter including a power conversion unit configured to transmit wireless power generated based on magnetic coupling to a wireless power receiver in a power transfer phase, and a communication/control unit configured to perform initial calibration for a power parameter before the power transfer phase, receive, from the wireless power receiver, a first received power packet informing the power received by the wireless power receiver during the power transfer phase, and perform a detection of foreign objects using the received power and a first power loss determined based on the initial calibration.

Here, the communication/control unit may be configured to perform subsequent calibration for the power parameter and perform the detection of the foreign objects using a second power loss determined based on the subsequent calibration.

In one aspect, the communication/control unit may receive a second received power packet from the wireless power receiver during the power transfer phase, the first received power packet may include a first mode field informing that a first received power value informed by the first received power packet is a normal value, and the second received power packet may include a second mode field informing that a received power value informed by the second received power packet is a second received power value in a connected load state.

In another aspect, the power parameter before the power transfer phase may include a light load received power value received by the wireless power receiver under a condition that no load is connected to the wireless power receiver and a connected load received power value received by the wireless power receiver under a condition that the load is connected to the wireless power receiver, the power parameter during the power transfer phase may include the second received power value, and the communication/control unit may perform the subsequent calibration based on the light load received power value, the connected load received power value, and the second received power value.

In another aspect, the communication/control unit may transmit a bit pattern requesting an initiation of re-ping to the wireless power receiver based on the change in the magnetic coupling.

In another aspect, the communication/control unit may receive a re-ping initiation packet from the wireless power receiver in response to the bit pattern.

In another aspect, the re-ping initiation packet may include an end power transfer (EPT) packet for initiating the re-ping.

In another aspect, the communication/control unit may enter a re-ping phase based on the re-ping initiation packet, and perform the initial calibration again in the re-ping phase.

According to another aspect of the present disclosure, there is provided a wireless power transmitter including a power pickup unit configured to receive wireless power generated based on magnetic coupling to a wireless power receiver in a power transfer phase, and a communication/control unit configured to perform initial calibration for a power parameter before the power transfer phase and transmit, from the wireless power transmitter, a first received power packet informing the received power during the power transfer phase.

Here, the communication/control unit may be configured to perform the subsequent calibration for the power parameter.

In one aspect, the communication/control unit may transmit a second received power packet to the wireless power transmitter during the power transfer phase, the first received power packet may include a first mode field informing that a first received power value informed by the first received power packet is a normal value, and the second received power packet may include a second mode field informing that a received power value informed by the second received power packet is a second received power value in a connected load state.

In another aspect, the power parameter before the power transfer phase is a light load received power value received by the wireless power receiver under a condition that no load is connected to the wireless power receiver and a connected load received power value received by the wireless power receiver under a condition that the load is connected to the wireless power receiver, and the power parameter during the power transfer phase may include the second received power value.

In another aspect, when the magnetic coupling is changed to a certain level or higher, the communication/control unit may receive a bit pattern requesting an initiation of re-ping from the wireless power transmitter.

In another aspect, the communication/control unit may transmit a re-ping initiation packet from the wireless power receiver in response to the bit pattern.

In another aspect, the re-ping initiation packet may include an end power transfer (EPT) packet for initiating the re-ping.

In another aspect, the communication/control unit may enter a re-ping phase based on the re-ping initiation packet, and perform the initial calibration again in the re-ping phase.

According to another aspect of the present disclosure, there is provided a method for performing power calibration including: performing initial calibration for a power parameter before a power transfer phase; transmitting wireless power generated based on magnetic coupling to a wireless power receiver in the power transfer phase; receiving, from the wireless power receiver, a first received power packet informing power received by the wireless power receiver during the power transfer phase; performing a detection of foreign objects using a first power loss determined based on the received power and the initial calibration; performing subsequent calibration on the power parameter; and performing the detection of the foreign objects using the second power loss based on the subsequent calibration.

In another aspect, the method may further include receiving a second received power packet from the wireless power receiver during the power transfer phase, in which the first received power packet may include a first mode field informing that a first received power value informed by the first received power packet is a normal value, and the second received power packet may include a second mode field informing that a received power value informed by the second received power packet is a second received power value in a connected load state.

In another aspect, the power parameter before the power transfer phase may include a light load received power value received by the wireless power receiver under a condition that no load is connected to the wireless power receiver and a connected load received power value received by the wireless power receiver under a condition that the load is connected to the wireless power receiver, the power parameter during the power transfer phase may include the second received power value, and the subsequent calibration may be performed based on the light load received power value, the connected load received power value, and the second received power value.

In another aspect, the method may further include transmitting a bit pattern requesting an initiation of re-ping to the wireless power transmitter based on the change in the magnetic coupling Advantageous Effects It is possible to more sophisticatedly detect the foreign objects by calibrating the transmitted power and received power by adaptively reacting to the newly changed wireless charging environment and detecting the power loss based on the calibrated transmitted power and received power.

DESCRIPTION OF DRAWINGS

FIG. 10 is a structure of a sync pattern according to an embodiment.

FIG. 13 is a diagram illustrating a received power packet according to an embodiment.

FIG. 19 is a structural diagram illustrating an EPT packet for initiating re-ping according to an embodiment.

MODE FOR DISCLOSURE

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
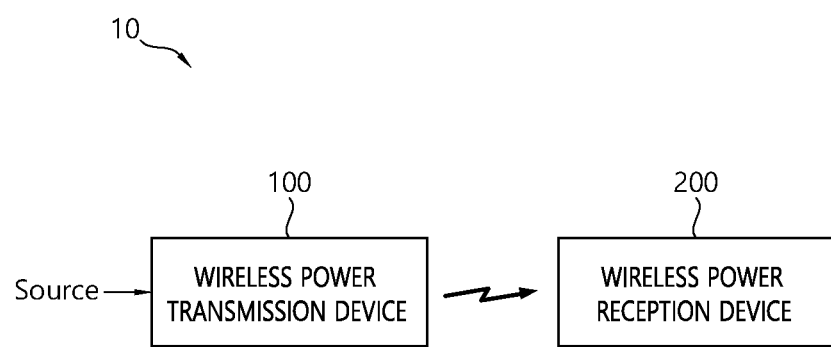
FIG. 1 is a block diagram of a wireless power system (10) according to an embodiment.

FIG. 1 is a block diagram of a wireless power system (10) according to an embodiment.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
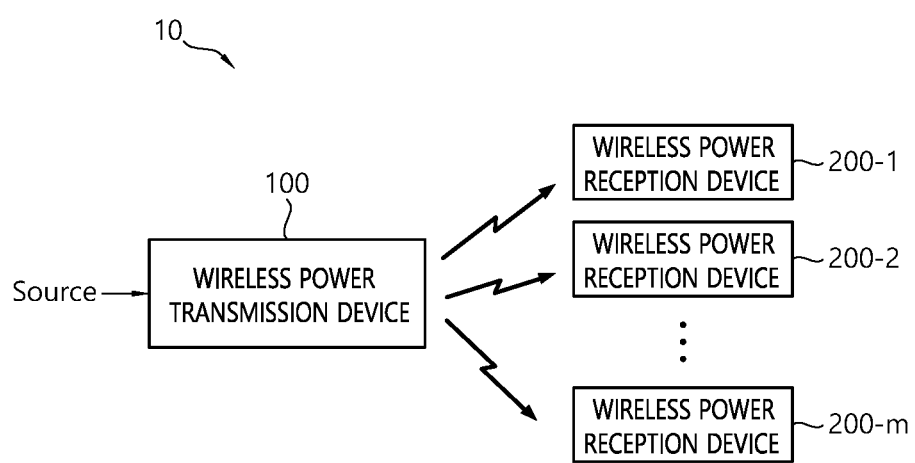
FIG. 2 is a block diagram of a wireless power system (10) according to another embodiment.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
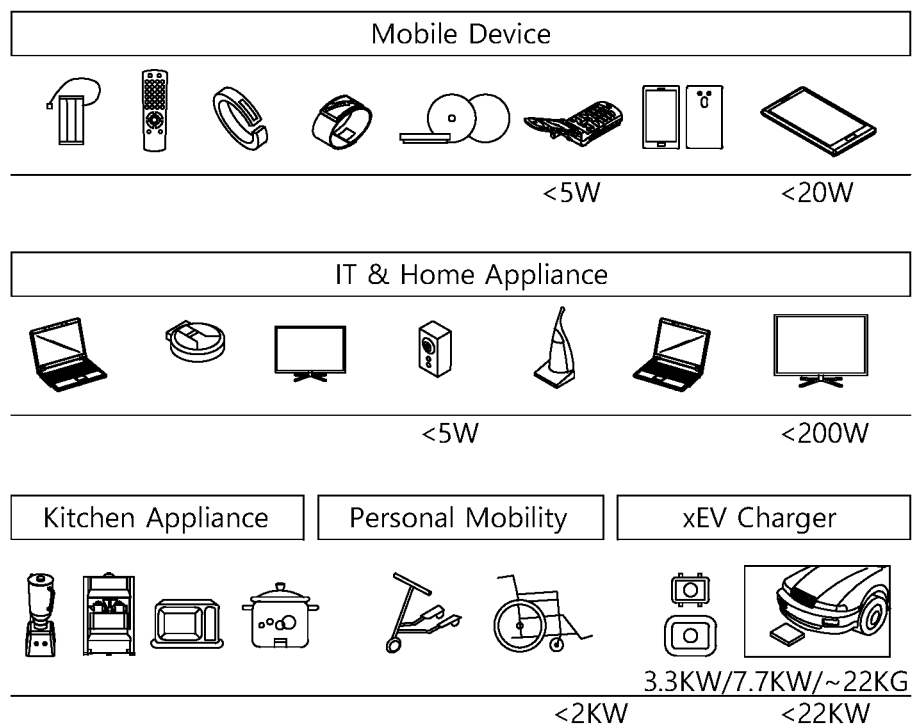
FIG. 3 shows an exemplary embodiment of diverse electronic devices adopting a wireless power transmission system.

FIG. 3 shows an exemplary embodiment of diverse electronic devices adopting a wireless power transmission system.

As shown in FIG. 3, the electronic devices included in the wireless power transmission system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the this specification will be described based on a mobile device adopting the wireless power charging method, this is merely exemplary. And, therefore, it shall be understood that the wireless charging method according to this specification may be applied to diverse electronic devices.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ###hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than SW and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than SW. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (TB) communication corresponds to a mandatory communication protocol of PC0, out-of-band (OBB) communication that is used as an optional backup channel may also be used for PC0. The wireless power receiver may be identified by setting up an OOB flag, which indicates whether or not the OOB is supported, within a configuration packet. A wireless power transmitter supporting the OOB may enter an OOB handover phase by transmitting a bit-pattern for an OOB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OOB corresponds to a mandatory communication channel for PC1, and IB is used for initialization and link establishment to OOB. The wireless power transmitter may enter an OOB handover phase by transmitting a bit-pattern for an OOB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transmission/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transmission/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Hereinafter, 'profiles' will be newly defined based on indexes/reference standards representing/indicating the compatibility. More specifically, it may be understood that by maintaining compatibility between wireless power transmitters and receivers having the same 'profile', stable power transmission/reception may be performed, and that power transmission/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OOB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transmission only to the wireless power receiving corresponding to the same profile as the wireless power transmitter, thereby being capable of performing a more stable power transmission. Additionally, since the load (or burden) of the wireless power transmitter may be reduced and power transmission is not attempted to a wireless power receiver for which compatibility is not possible, the risk of damage in the wireless power receiver may be reduced.

PC1 of the 'Mobile' profile may be defined by being derived from an optional extension, such as OOB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| | $P_{TX\_IN\_MAX}$ | Minimum category support requirement | Minimum value for a maximum number of supported devices |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 4:
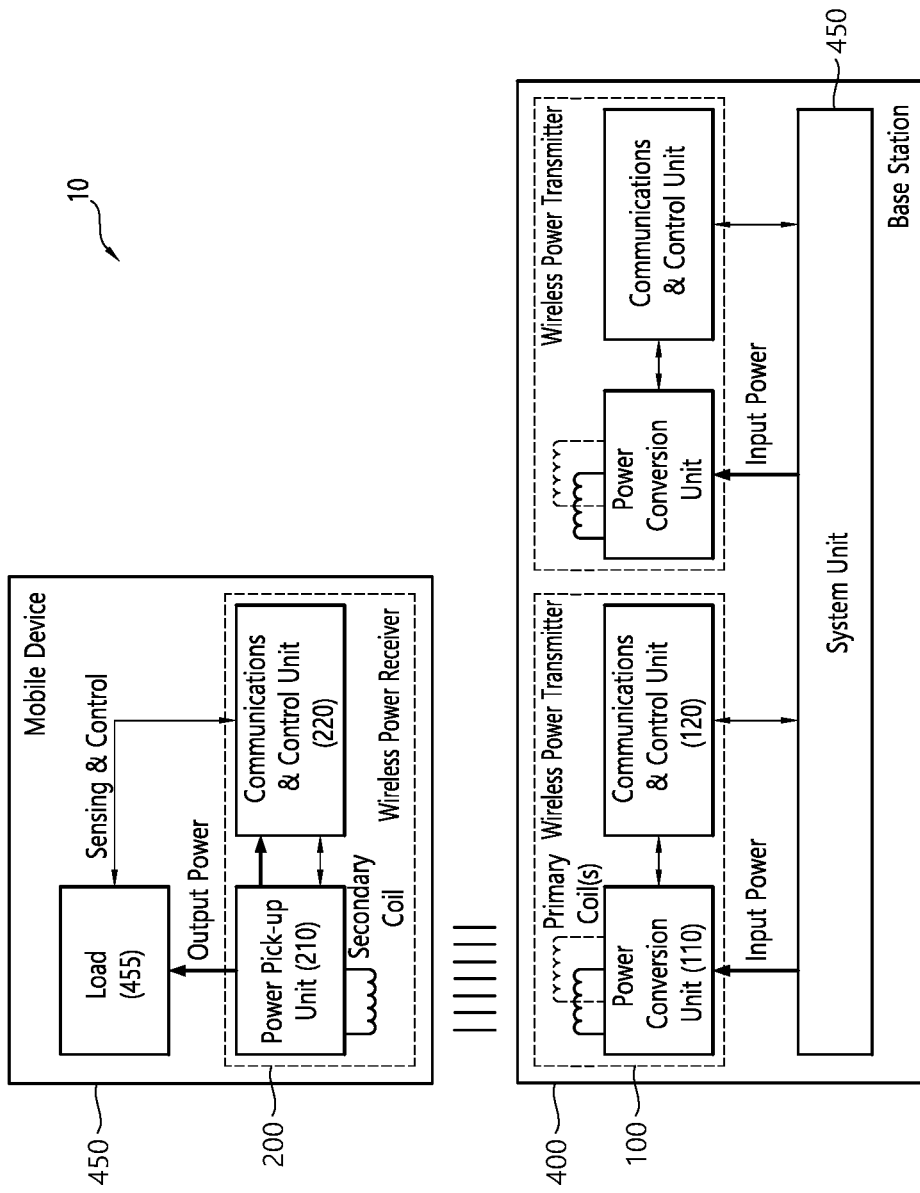
FIG. 4 is a block diagram of a wireless power transmission system according to another embodiment.

As shown in Table 1, a maximum output power capability of Class n PTU may be equal to or greater than the PTX_IN_MAX of the corresponding class. The PRU cannot draw a power that is higher than the power level specified in the corresponding category. FIG. 4 is a block diagram of a wireless power transmission system according to another embodiment.

Referring to FIG. 4, the wireless power transmission system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a primary core, a primary winding, a primary loop antenna, and so on. Meanwhile, the secondary coil may also be referred to as a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OOB communication module.

The IB communication module may transmit and/or receive information by using a magnetic wave, which uses a specific frequency as its center frequency. For example, the communications & control unit (120) may perform in-band (IB) communication by loading information in the magnetic wave and by transmitting the information through the primary coil or by receiving a magnetic wave carrying information through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operation point, the communications & control unit (120) may control the transmitted power. The operation point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OOB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OOB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that can execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
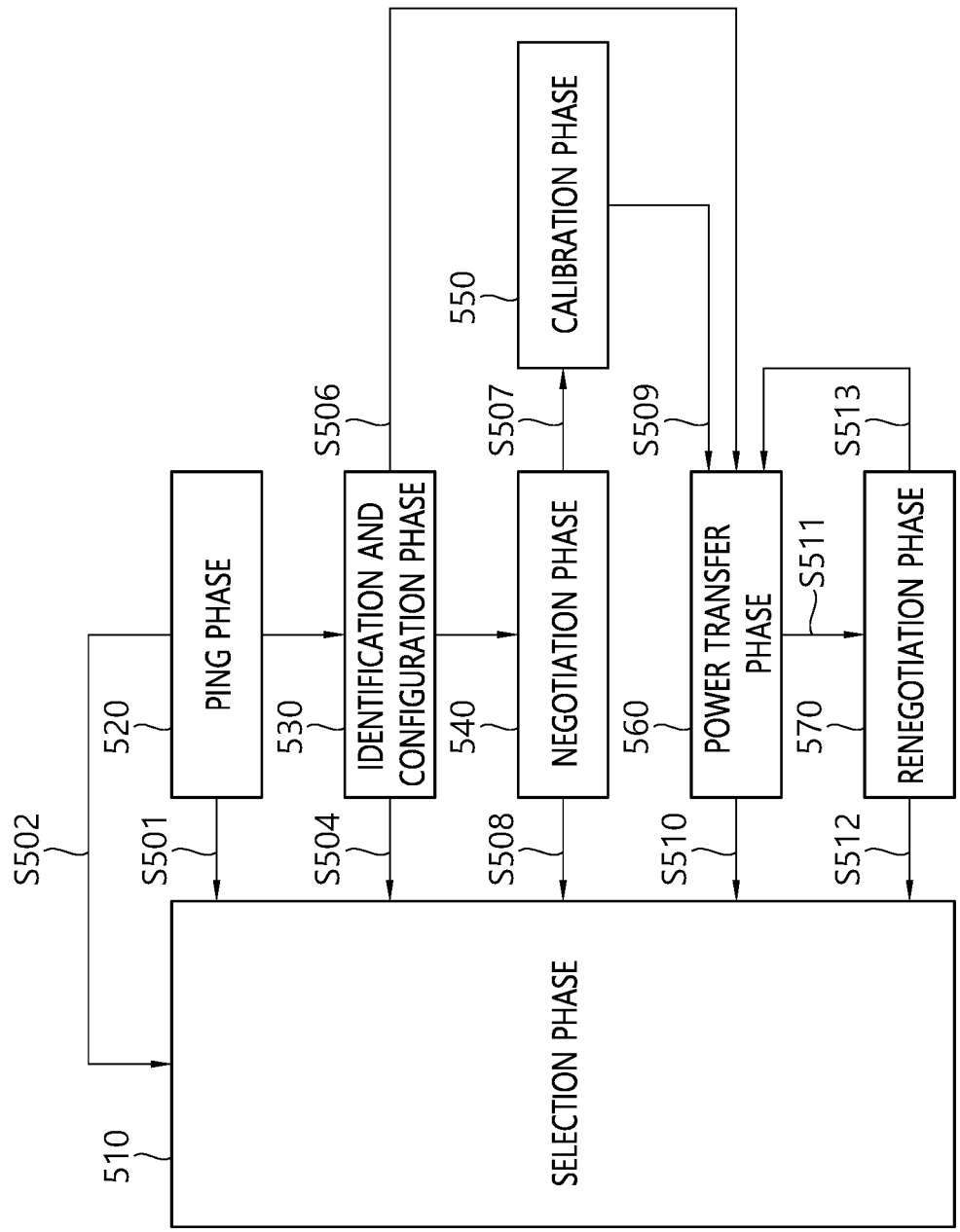
FIG. 5 is a state transition diagram for describing a wireless power transfer procedure.

FIG. 5 is a state transition diagram for describing a wireless power transfer procedure.

Referring to FIG. 5, the power transmission (or transfer) from the wireless power transmitter to the wireless power receiver according to an embodiment may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)-reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having an extremely short pulse and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transmission coil and/or resonance capacitor). According to the embodiment, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value-in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another embodiment, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet-from the receiver, the process may be shifted back to the selection phase (510). Additionally, in the ping phase (520), if the wireless power transmitter receives a signal indicating the completion of the power transfer—e.g., charging complete packet-from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, this specification will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, this specification will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the embodiment may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

The above-described power transfer contract may be configured based on the status and characteristic information of the wireless power transmitter and receiver. For example, the wireless power transmitter status information may include information on a maximum amount of transmittable power, information on a maximum number of receivers that can be accommodated, and so on. And, the receiver status information may include information on the required power, and so on.

Figure 6:
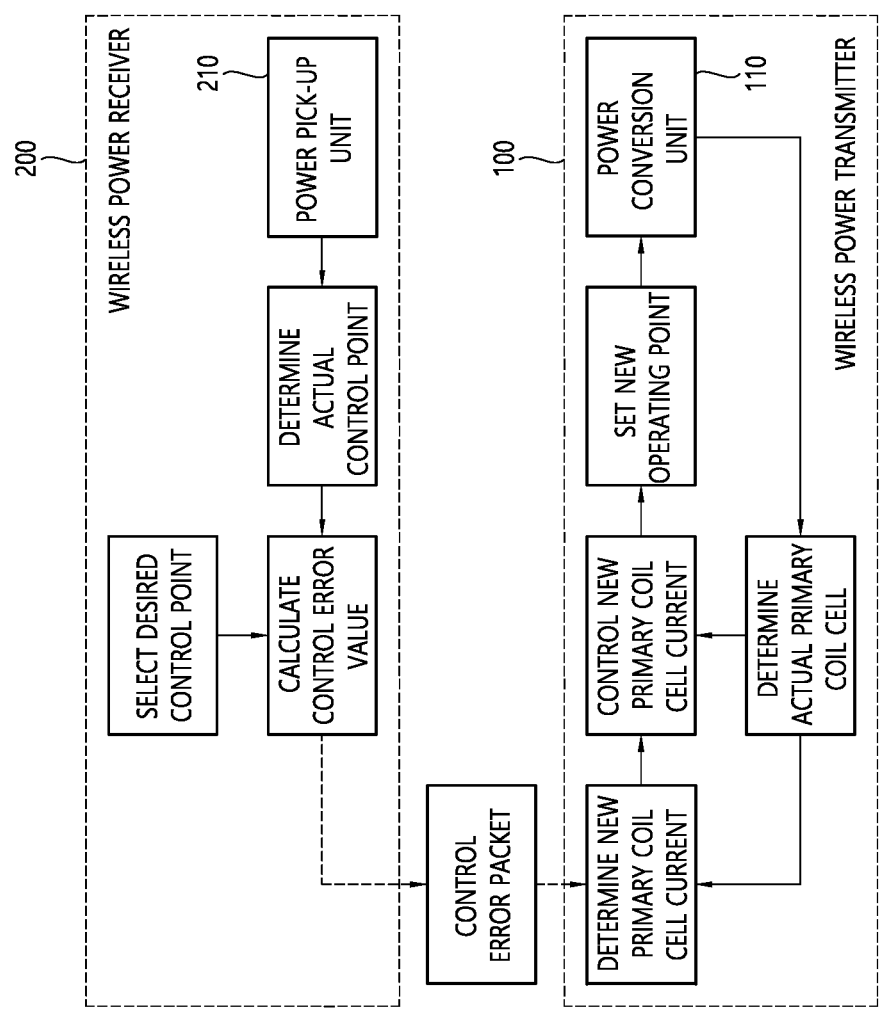
FIG. 6 shows a power control method according to an embodiment.

FIG. 6 shows a power control method according to an embodiment.

As shown in FIG. 6, in the power transfer phase (560), by alternating the power transmission and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operation point-amplitude, frequency, and duty cycle-by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to this specification, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
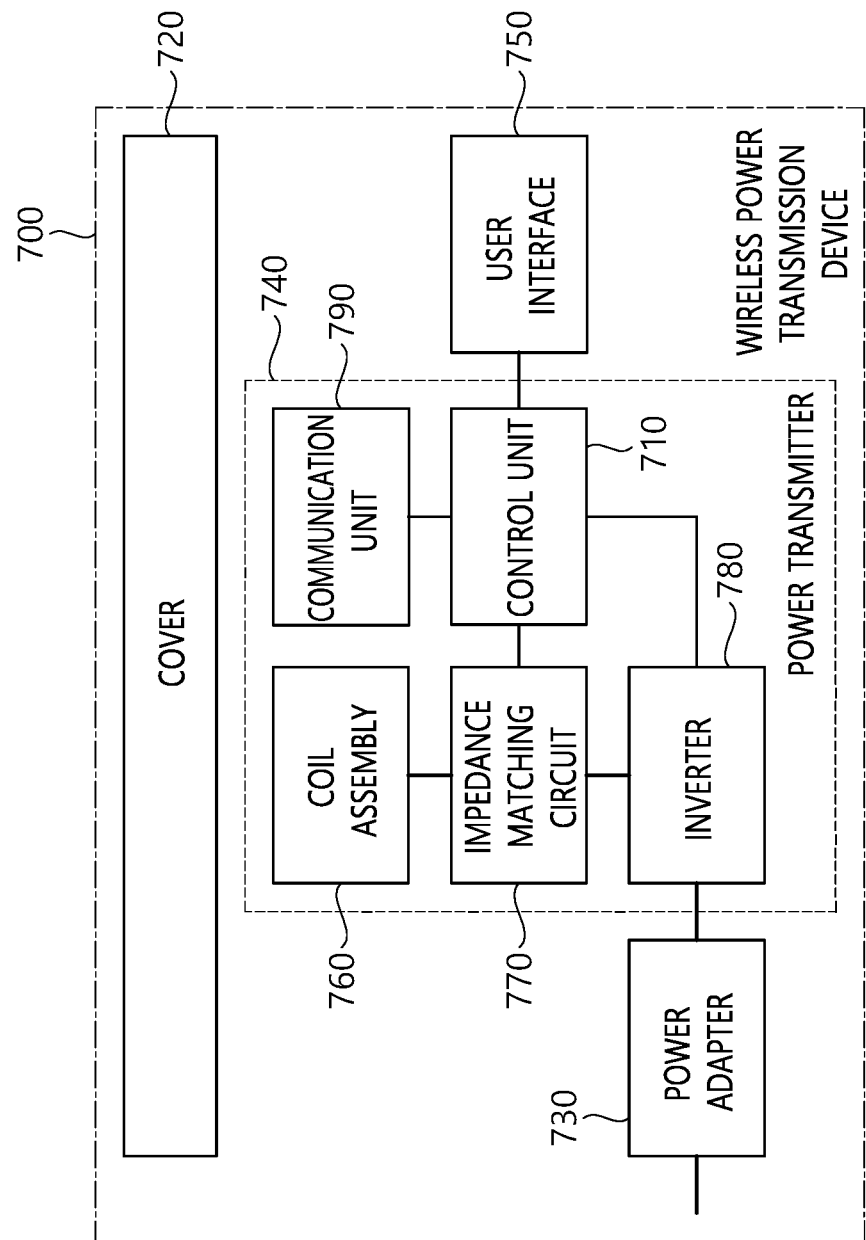
FIG. 7 is a block diagram of a wireless power transmitter according to another embodiment.

FIG. 7 is a block diagram of a wireless power transmitter according to another embodiment. This may belong to a wireless power transmission system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data can be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operation point. The operation point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
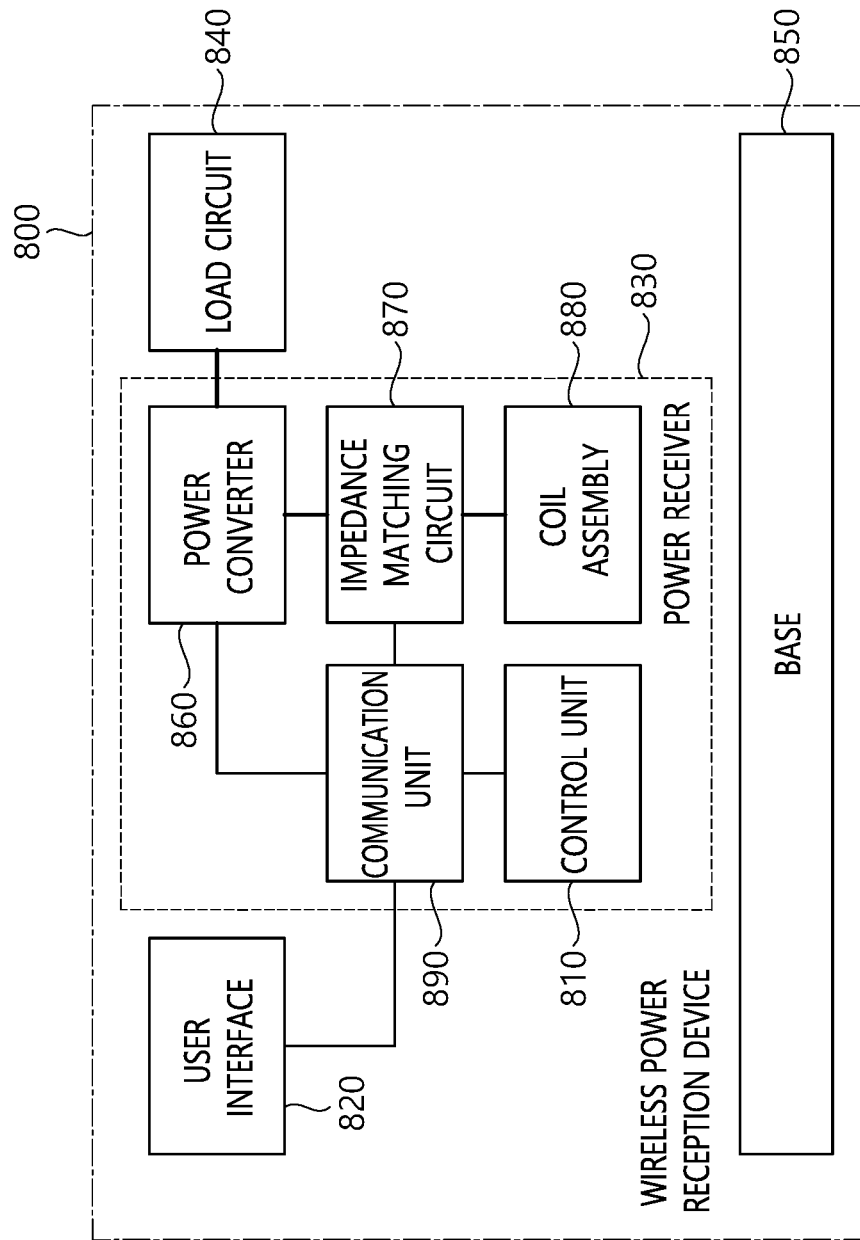
FIG. 8 shows a wireless power receiver according to another embodiment.

FIG. 8 shows a wireless power receiver according to another embodiment. This may belong to a wireless power transmission system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which can reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operation point and a desired operation point of the power receiver (830). Thereafter, by performing a request for adjusting the reflected impedance of the power transmitter and/or for adjusting an operation point of the power transmitter, the difference between the actual operation point and the desired operation point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
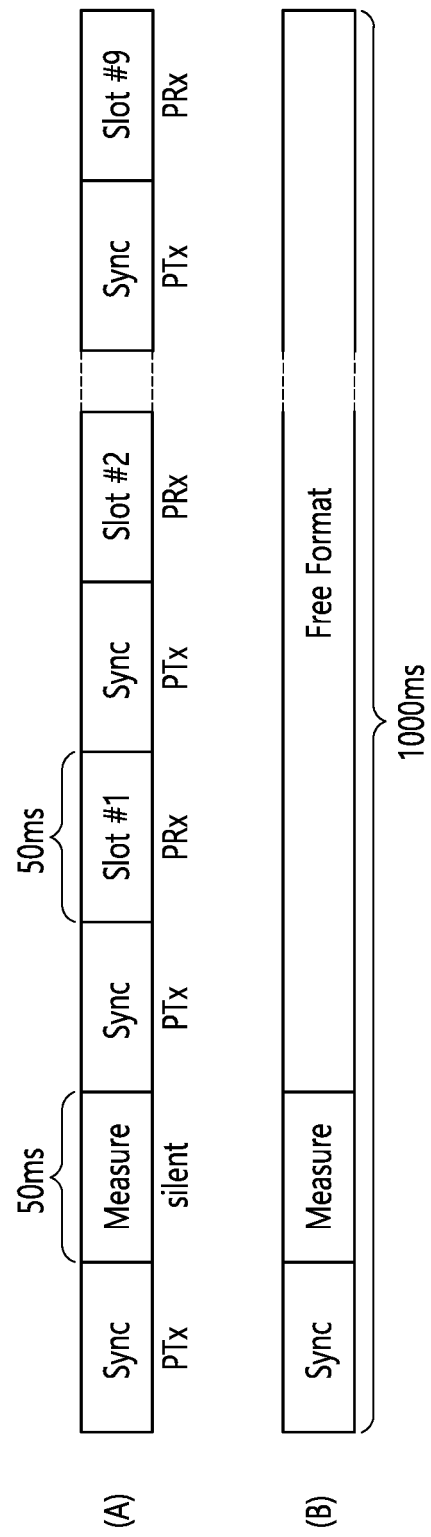
FIG. 9 shows a communication frame structure according to an embodiment.

FIG. 9 shows a communication frame structure according to an embodiment. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an embodiment.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern can be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that can be freely used by a random wireless power receiver, the information field is given a value of '10'.

Figure 11:
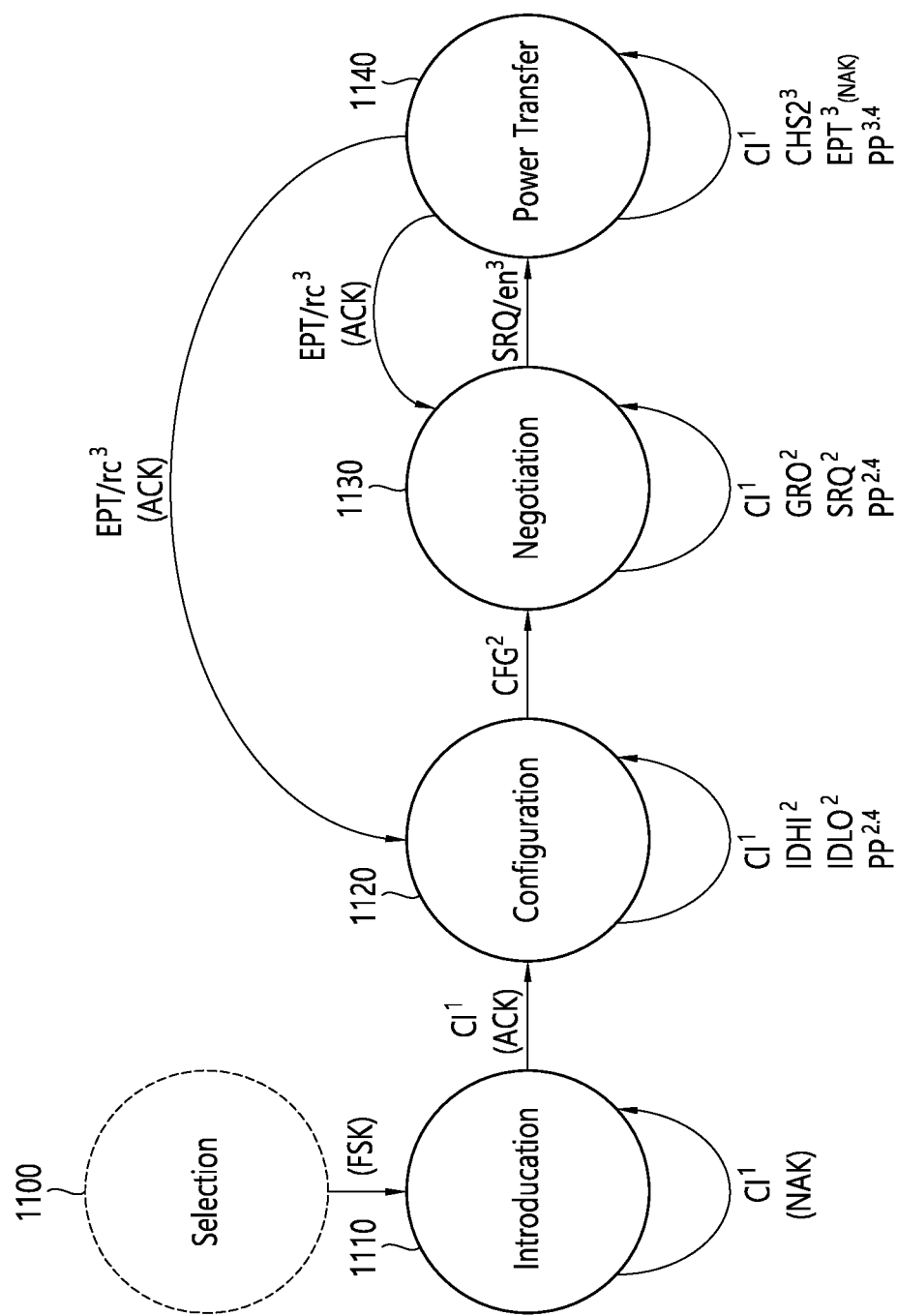
FIG. 11 shows operation statuses of a wireless power transmitter and a wireless power receiver in a shared mode according to an embodiment.

FIG. 11 shows operation statuses of a wireless power transmitter and a wireless power receiver in a shared mode according to an embodiment.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the embodiment may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power transmitter enters the configuration phase. If the wireless power transmitter transmits a NACK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, a method of detecting foreign objects and a method for performing power calibration will be described.

When a wireless power transmitter transmits wireless power to a wireless power receiver using a magnetic field, if foreign objects exist in the vicinity, some of the magnetic field is absorbed into the foreign objects. That is, some of the wireless power transmitted by the wireless power transmitter is supplied to the foreign objects, and the rest is supplied to the wireless power receiver. From the viewpoint of power transfer efficiency, transmitted power is lost as much as power or energy absorbed by the foreign objects. In this way, a causal relationship can be established between the existence of the foreign objects and the power loss (Ploss), so the wireless power transmitter may detect the foreign objects based on how much power loss occurs. The method for detecting foreign objects may be referred to as a method for detecting foreign objects based on the power loss.

The power lost by the foreign objects may be defined as a value obtained by subtracting the power (Preceived) actually received by the wireless power receiver from the power (Ptransmitted) transmitted from the wireless power transmitter. From the viewpoint of the wireless power transmitter, since the power (Ptransmitted) transmitted from the wireless power transmitter is known, it is possible to obtain the lost power by knowing only the power (Preceived) received by the wireless power receiver. To this end, the wireless power receiver may notify the wireless power transmitter of the received power (Preceived) by transmitting the received power packet (RPP) to the wireless power transmitter.

Meanwhile, the wireless power transmitter and the wireless power receiver include various circuit components provided therein and are constituted as independent devices from each other, but since the wireless power transfer is performed by magnetically coupling between the wireless power transmitter and the wireless power receiver, the wireless power transmitter and the wireless power receiver constitute one wireless power transfer system. However, an error may occur between the transmitted power and received power due to a change in the magnetic coupling according to the actual use environment (signal size, frequency, and duty cycle applied to the wireless power transfer system, distance/position alignment between Tx and the Rx, and the like) of Tx and Rx as well as unique physical characteristics of the wireless power transfer system. The error may be an obstacle to a sophisticated detection of foreign objects.

Therefore, there is a need for a method of deriving the calibrated transmitted power and received power by reflecting the unique characteristics of the wireless power transfer system and the change in the actual use environment, and performing more sophisticated FOD based on the derived calibrated transmitted power and received power.

Figure 12:
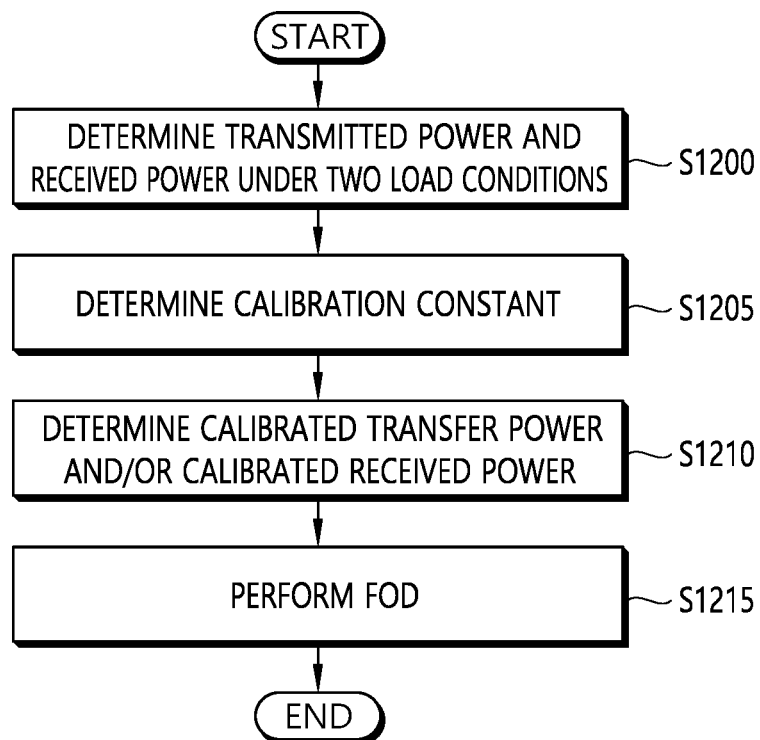
FIG. 12 is a flowchart illustrating a method for performing power calibration and a method for performing FOD according to an embodiment.

FIG. 12 is a flowchart illustrating a method for performing power calibration and a method for performing FOD according to an embodiment. The method for performing power calibration according to the present embodiment may be performed in the calibration phase of FIG. 5. The method for performing FOD according to the present embodiment may be performed in the power transfer phase of FIG. 5. The method for performing FOD in the present embodiment may include calibrating power parameters (transmitted power and/or received power).

Referring to FIG. 12, the wireless power transmitter or the wireless power receiver performs a step 1200 of determining the transmitted power and received power under two different load conditions.

Here, the two load conditions include a "light load" condition and a "connected load" condition. For example, the load may be a battery included in or connected to the wireless power receiver. Since the light load is not connected to the wireless power receiver (i.e., an output disconnect switch is open), the transmitted power and/or the received power at the light load condition is close to minimum expected output power. On the other hand, since the connected load is a state where the load is connected to the wireless power receiver (i.e., an output opening/closing switch is closed), the transmitted power and/or the received power at the connected load condition is close to at the maximum expected output power.

In step S1200, the wireless power transmitter may include determining first transmitted power under the light load condition and determining first received power from first received power packet (RPP) received from the wireless power receiver, and determining, by the wireless power transmitter, second transmitted power and determining second received power from a second received power packet (RPP) received from the wireless power transmitter. That is, the wireless power receiver determines the first received power under the light load condition, transmits the first received power packet indicating the first received power to the wireless power transmitter, determines the second received power under the connected load condition, and transmits the second received power packet indicating the second received power to the wireless power transmitter.

FIG. 13 is a diagram illustrating a received power packet according to an embodiment.

Referring to FIG. 13, the received power packet is composed of 3 bytes (24 bits), and a first byte (B0) includes 5 bits of reserved bits and 3 bits of a mode field. Second and third bytes B1 and B2 include a field indicating the received power value. The mode field indicates under which condition the received power value included in the received power packet is determined, and may be defined as shown in Table 3, for example.

TABLE 3

| Mode | Description |
| --- | --- |
| '000' | Normal value; response requested |
| '001' | Light load calibration value; response requested |
| '10' | Connected load calibration value; response requested |
| '11' | Reserved |
| '100' | Normal value; no response expected |

Referring to Table 3, when determining the received power under the light load condition, the wireless power receiver transmits a mode field indicating light load calibration value '001' and a first received power packet including the corresponding received power value to the wireless power transmitter. Meanwhile, when determining the received power under the connected load condition, the wireless power receiver transmits a mode field indicating connected load calibration value '001' and a second received power packet including the corresponding received power value to the wireless power transmitter.

The wireless power transmitter may determine from the mode field of the received power packet received whether the corresponding received power value is the received power value under the light load condition or the received power value under the connected load condition.

Referring back to FIG. 12, the wireless power transmitter determines at least one calibration constant based on power variables (transmitted power under the light load condition, received power under the light load condition, transmitted power under the connected load condition, and received power under the connected load condition) determined under the two load conditions (S1205).

The wireless power transmitter may calibrate the transmitted power and/or the received power by applying linear interpolation to the power parameters (transmitted power and/or received power) determined based on the two load conditions.

When the transmitted power and received power determined under each load condition are x and y, respectively, two coordinates (x and y) are obtained. One is first coordinates (x1 and y1) under the light load condition, and the other is second coordinates (x2 and y2) under the connected load condition. These two coordinates are as illustrated in a graph in FIG. 14.

Figure 14:
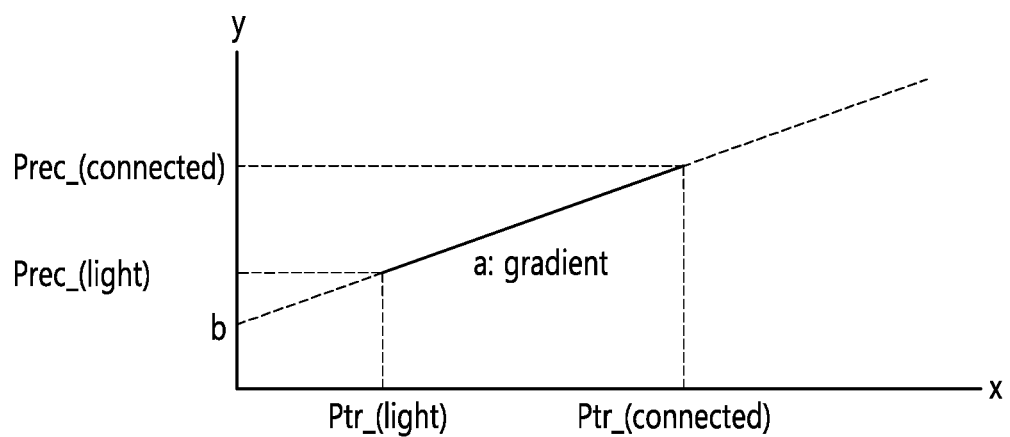
FIG. 14 is a diagram illustrating a calibration curve based on linear interpolation according to an embodiment.

FIG. 14 illustrates a calibration curve based on linear interpolation according to an embodiment.

Referring to FIG. 14, when a first coordinate composed of transmitted power (Ptr (light)) and received power (Prec (light)) under the light load condition and a second coordinate composed of transmitted power (Ptr (light)) and received power (Ptr (connected)) under the connected load condition are connected to each other by the linear interpolation, a linear curve whose a gradient is a and a y-axis offset is b is derived. Here, a may be called a first calibration constant, and b may be called a second calibration constant.

The calibration constants a and b may be derived by the calibration curve of FIG. 14, and the derivation process is expressed by the following Equations.

$$a = \frac{P_{received}^{(connected)} - P_{received}^{(light)}}{P_{transmitted}^{(connected)} - P_{transmitted}^{(light)}}$$ [Equation 1]

$$b = \frac{P_{transmitted}^{(connected)} P_{received}^{(light)} - P_{received}^{(connected)} P_{transmitted}^{(light)}}{P_{transmitted}^{(connected)} - P_{transmitted}^{(light)}}$$ [Equation 2]

The present embodiment relates to a calibration using the two coordinates according to the two load conditions, which may also be referred to as a two point calibration. Also, the calibration curve may be called a calibration function based on at least one calibration constant. Therefore, the step of determining the calibration constant according to step S1205 may be referred to as the step of determining the calibration function. In addition, the present embodiment uses the linear interpolation in obtaining the calibration constant, but the interpolation method is not limited thereto.

Referring back to FIG. 12, when the calibration constants are determined as above, the wireless power transmitter completes the calibration phase and enters the power transfer phase. The wireless power transmitter determines the transmitted power in the power transfer phase and receives the received power packet from the wireless power receiver. At this time, the wireless power transmitter determines the calibrated transmitted power and/or received power by calibrating the power parameters (transmitted power and/or received power) determined in the power transfer phase using the calibration function (S1210).

In one aspect, the method for determining the calibrated transmitted power includes determining a scaled transmitted power (a-Ptransmitted) by multiplying the transmitted power (Ptransmitted) determined in the power transfer phase by the first calibration constant (a), and determining calibrated transmitted power (Pcalibrated) by adding the second calibration constant (b) to the scaled transmitted power. The method for calculating the calibrated transmitted power can be expressed as the following Equation (3).

$$P_{calibrated} = a\, P_{transmitted} + b$$ [Equation 3]

The wireless power transmitter determines the power loss based on the calibrated power parameters (transmitted power and/or received power), and performs the FOD based on the determined power loss (S1215). The wireless power transmitter may perform i) the FOD based on the calibrated transmitted power and the uncalibrated received power, perform ii) the FOD based on the uncalibrated transmitted power and the calibrated received power, and perform iii) the FOD based on the calibrated transmitted power and the calibrated received power. In the case of example i), the wireless power transmitter may determine the power loss based on a difference value between the calibrated transmitted power (Pcalibrated) and the uncalibrated received power (Precevied) as in Equation (4).

$$P_{loss} = P_{calibrated} - P_{received}$$ [Equation 4]

In the case of examples ii) and iii), the wireless power transmitter may also determine the calibrated received power in addition to the calibrated transmitted power.

If the determined power loss exceeds a threshold, the wireless power transmitter may determine that foreign objects exist and stop power transfer. On the other hand, if the determined power loss does not exceed the threshold, the wireless power transmitter may determine that the foreign objects do not exist and continue the power transfer.

Steps S1200 to S1205 correspond to the calibration phase, and steps S1210 to S1215 correspond to the power transfer phase. In the present embodiment, although the calibration phase and the power transfer phase are divided into separate phases, the calibration phase may be included in the power transfer phase, and in this case, the calibration may be performed in the power transfer phase.

The wireless power transmitter in the embodiment according to FIG. 12 corresponds to the wireless power transfer device, the wireless power transmitter, or the power transmitting unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, an operation of determining the transmitted power and/or the received power under the two load conditions according to step S1200, an operation of determining the calibration constant (or calibration curve or calibration function) according to step S1205, an operation of determining the calibrated transmitted power and/or received power according to step S1210, and an operation of performing the FOD according to step S1215 may be performed by the communication/control unit 120.

In addition, the wireless power receiver in the embodiment according to FIG. 12 corresponds to the wireless power transfer device, the wireless power transmitter, or the power transmitting unit disclosed in FIGS. 1 to 11. Accordingly, the operation of the wireless power transmitter in the present embodiment is implemented by one or two or more combinations of each component of the wireless power receiver in FIGS. 1 to 11. For example, in the present embodiment, an operation of determining the first received power under the light load condition and generating the first received power packet indicating the first received power and transmitting the generated first received power packet to the wireless power transmitter, and an operation of determining the second received power under the connected load condition and generating the second received power packet indicating the second received power and transmitting the generated second received power packet to the wireless power transmitter may be performed by the communication/control unit 220.

In the case of the two point calibration, the power calibration is performed once in the calibration phase before the power transfer phase, and as a result, the calibration curve may be defined as illustrated in FIG. 14. If the calibration curve (or calibration constant) is defined once in the calibration phase, it is estimated that the calibration constant and the calibration curve are no longer changed in the power transfer phase, and all the combinations of transmitted power and received power in the power transfer phase in the future correspond to one coordinate on the calibration curve illustrated in FIG. 14, and the wireless power transmitter uniformly performs the FOD according to the graph above.

However, there may be a case where the transmitted power and/or the received power does not follow a predetermined calibration curve due to various causes during power transfer. For example, when the wireless power receiver increases the connected load during the power transfer, or when the magnetic coupling between the wireless power transmitter and the receiver changes sharply, the existing calibration constants and calibration curves do no longer match new transmitted power and received power according to the changed environment. That is, poor approximation of the overall relationship between transmitted power and received power may occur. In this case, when the calibrated transmitted power and received power are determined based on the ineffective calibration constant and the calibration graph, and the FOD is performed based on the determined transmitted power and received power, the reliability of the FOD very deteriorates. In particular, it becomes very difficult to detect foreign objects inserted during the power transfer. However, to change the calibration curve (or calibration constant), the wireless power transmitter and/or the wireless power receiver that returns to the ping phase again, and then enters the calibration phase has a problem in that the wireless charging is interrupted halfway.

Therefore, there is a need for a method capable of adaptively reacting to the newly changed wireless charging environment to detect a power loss and maintain reliability of FOD. That is, a method for calibrating power parameters based on adaptive power loss detection (APLD) is required.

The method for performing power calibration according to the present embodiment may include performing the subsequent calibration to increase the accuracy of the transmitted power and/or the received power that is the basis of the FOD determination, in a state where the initial calibration (or initial calibration curve, initial calibration constant, or initial calibration function) for the power parameters is no longer effective due to the increase in power or the change in coupling.

Here, the subsequent calibration may be triggered when a specific event occurs. Hereinafter, a specific event that triggers the subsequent calibration is simply called a trigger event. The trigger event may indicate a state or a cause that the initial calibration is no longer effective. The subsequent calibration is additionally performed to correct or supplement the previously performed calibration. In this sense, the term subsequent calibration is used to be distinguished from the initial calibration, and may be replaced by other terms with the same meaning and function. The trigger event may include various types depending on the cause.

As an example, the trigger event may include an event (that is, event in which a target rectified voltage (Vrec) increases or even in which the received power value increases than the received power value in the previous load connected condition) in which the load of the wireless power receiver is increased to a certain level or higher during the power transfer over the previous connected load. The trigger event may be called "load increase event". The wireless power transmitter and/or the wireless power receiver may determine whether the load increase event occurs, and when the load increase event is detected, may enter the subsequent calibration phase.

As another example, the trigger event may include an event (for example, event in which the position of the wireless power receiver is sharply changed) in which the magnetic coupling between the wireless power transmitter and the wireless power receiver is changed to a certain level or higher. The trigger event may be called "coupling change event". The wireless power transmitter and/or the wireless power receiver may determine whether the coupling change event occurs, and when the coupling change event is detected, may enter the subsequent calibration phase.

The subsequent calibration phase may be performed in different ways depending on the type of trigger event.

Subsequent Calibration with Increasing Load

Figure 15:
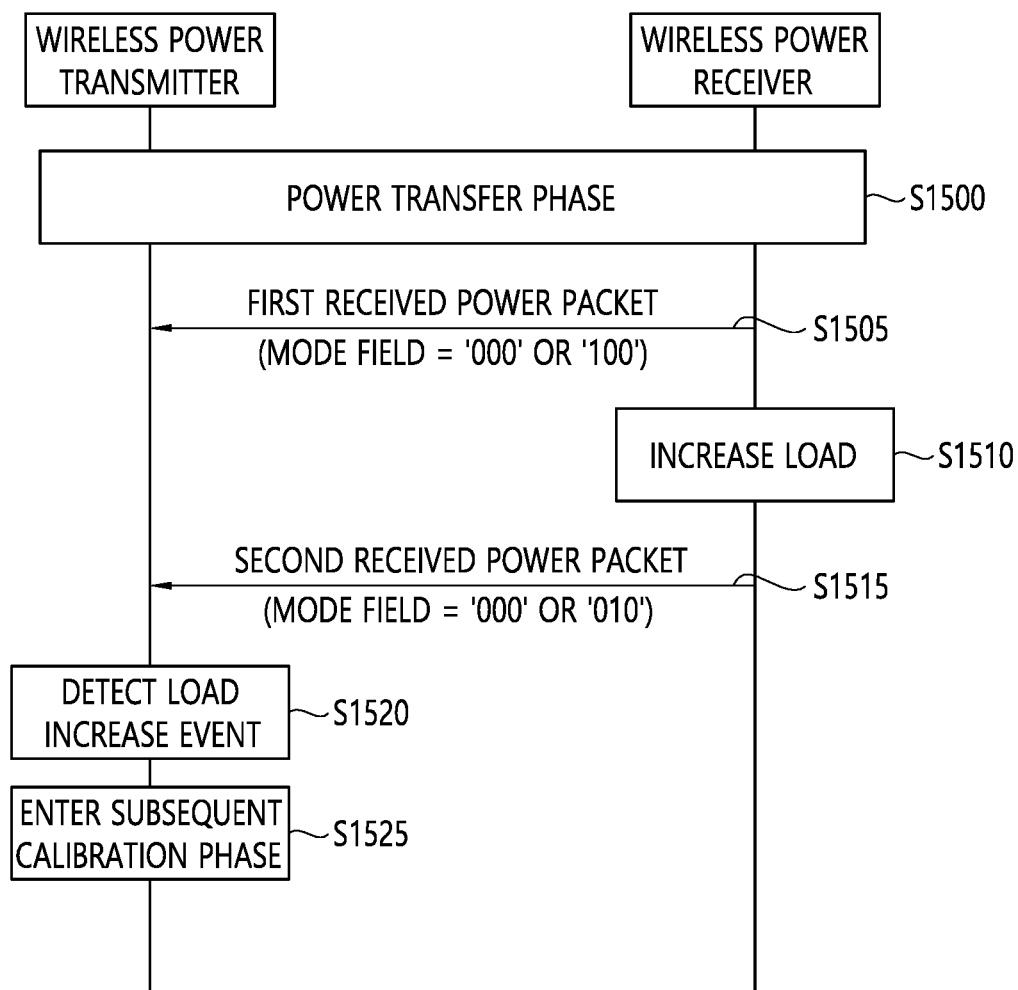
FIG. 15 is a flowchart illustrating a method for performing power calibration according to a load increase event.

As an example, when the load increase event occurs, the subsequent calibration in the form of the extension of the initial calibration may be performed. FIG. 15 illustrates a flowchart of the method for performing power calibration according to the present embodiment.

FIG. 15 is a flowchart illustrating a method for performing power calibration according to the load increase event. The method for performing power calibration according to the present embodiment may be performed in the power transfer phase of FIG. 5. The power calibration in the present embodiment may include calibrating power parameters (transmitted power and/or received power).

Referring to FIG. 15, the wireless power transmitter transmits the wireless power to the wireless power receiver in the power transfer phase (S1500). In the power transfer phase, the wireless power receiver transmits the first received power packet (RPP) in the form of FIG. 13 to the wireless power transmitter (S1505). The first received power packet includes a mode field, where the mode field may indicate '000' or '100' indicating that the received power value corresponds to a normal value (see Table 3).

During the power transfer phase over the previous connected load, when the load of the wireless power receiver increases above a certain level or higher (S1510), the wireless power receiver receives the second received power packet and transmits the received second received power packet to the wireless power transmitter (S1515). The increase in the load to a certain level or higher may mean that the target rectified voltage (target Vrec) of the wireless power receiver increases to a certain level or higher. Alternatively, the increase in the load to a certain level or higher may mean that the current received power is increased compared to the received power determined in the initial calibration phase. Alternatively, step S1510 may be replaced by the case where the wireless power received value does not exist in the calibration curve (or calibration section) according to the initial calibration. That is, step S1510 may be a case where the received power value is greater than the received power value in the previous connected load condition. This may mean that the received power value is out of the range of the existing calibration curve, and therefore the wireless power transmitter may no longer perform effective calibration. Therefore, in the subsequent calibration, the wireless power receiver under the load connected condition transmits the received power value to the wireless power transmitter so that the wireless power transmitter may perform the subsequent calibration.

The step S1515 may further include determining that the wireless power receiver determines that the initial calibration is no longer effective (or effective calibration may not be performed) and connecting the load mode to a connected load mode, when the power received value is out of the initial calibration section.

At this time, the mode field included in the second received power packet may indicate '010' indicating that the corresponding received power value is a received power value under the connected load condition. That is, the wireless power receiver sets the mode field to '010', generates the second received power packet including the mode field, and transmits the generated second received power packet to the wireless power transmitter.

In step S1515, the wireless power receiver may continuously transmit the second received power packet to the wireless power transmitter periodically or for a predetermined time period until an ACK response is received from the wireless power transmitter. For example, the predetermined time period may be 2 seconds. On the other hand, when the wireless power transmitter receives the second received power packet, a NAK response is transmitted until the control of the system is stabilized, and then when the control of the system is stabilized, the ACK response can be transmitted to the wireless power receiver.

According to the present embodiment, it is allowed to indicate the mode field as '010' in the power transfer phase as well as in the initial calibration phase before the power transfer phase. That is, the wireless power transmitter expects that the mode field received in the power transfer phase generally indicates '000' or '100', but the wireless power transmitter detects that the load increase event has occurred when receiving the mode field indicating '010' as an exception (S1520), and enters the subsequent calibration phase (S1525). Specifically, the operation of the wireless power transmitter is classified as follows according to at what phase the received power packet including the mode field indicating '010' is received. That is, when the wireless power transmitter receives a received power packet indicating a new connected load mode from the wireless power receiver in the power transfer phase, the wireless power transmitter may perform the subsequent calibration using the value. In this case, the calibration section (or range) of the calibration may increase according to the subsequent calibration.

As an example, when receiving the received power packet including the mode field indicating '010' in the initial calibration phase, the wireless power transmitter performs the initial calibration based on the received power value under the initial connected load.

As another example, when receiving the received power packet including the mode field indicating '010' in the power transfer phase, the wireless power transmitter performs the subsequent calibration based on the received power value under the changed connected load condition that the load increase event has occurred.

Even in the mode field indicating the same value, the interpretation and operation of the wireless power transmitter may be different according to whether the mode field is received in the initial calibration phase or the power transfer phase. Of course, it is also possible to configure to use a new value (for example, any one of 101-111 values) without reusing the mode field value '010', which is used in the initial calibration phase, in the power transfer phase. In this case, when receiving the received power packet including the mode field indicating the new value in the power transfer phase, the wireless power transmitter detects the load increase event (S1520) and enters the subsequent calibration phase (S1525).

In this way, when the mode field of the received power packet is set to a specific value (any one of 010 or 101-111) in the power transfer phase, it may be interpreted as indicating the occurrence of the load increase event occurs or the entry into the subsequent calibration phase.

The wireless power transmitter in the embodiment according to FIG. 15 corresponds to the wireless power transfer device, the wireless power transmitter, or the power transmitting unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, the operation of transmitting the wireless power to the wireless power receiver in the power transfer phase according to step S1500 may be performed by the power conversion unit 110. Also, the operation of receiving the first received power packet according to step S1505, the operation of receiving the second received power packet according to step S1515, the operation of detecting the load increase event according to step S1520, and the operation of entering the subsequent calibration phase according to step S1525 may be performed by the communication/control unit 120.

In addition, the wireless power receiver in the embodiment according to FIG. 15 corresponds to the wireless power receiving device, the wireless power receiver, or the power receiving unit disclosed in FIGS. 1 to 11. Accordingly, the operation of the wireless power transmitter in the present embodiment is implemented by one or two or more combinations of each component of the wireless power receiver in FIGS. 1 to 11. For example, in the present embodiment, the operation of receiving the wireless power from the wireless power transmitter in the power transfer phase according to step S1500 may be performed by the power pickup unit 210. In addition, the operation of generating and transmitting the first received power packet according to step S1505, the operation of increasing and detecting the load according to step S1510, and the operation of generating and transmitting the second received power packet according to step S1515 may be performed by the communication/control unit 220.

Meanwhile, the subsequent calibration phase according to step S1525 is described in more detail with reference to FIG. 16. In addition, although the subsequent calibration phase according to step S1525 was separately divided from the power transfer phase, it is needless to say that the subsequent calibration phase may be defined as the operation included in the power transfer phase without separately division.

Figure 16:
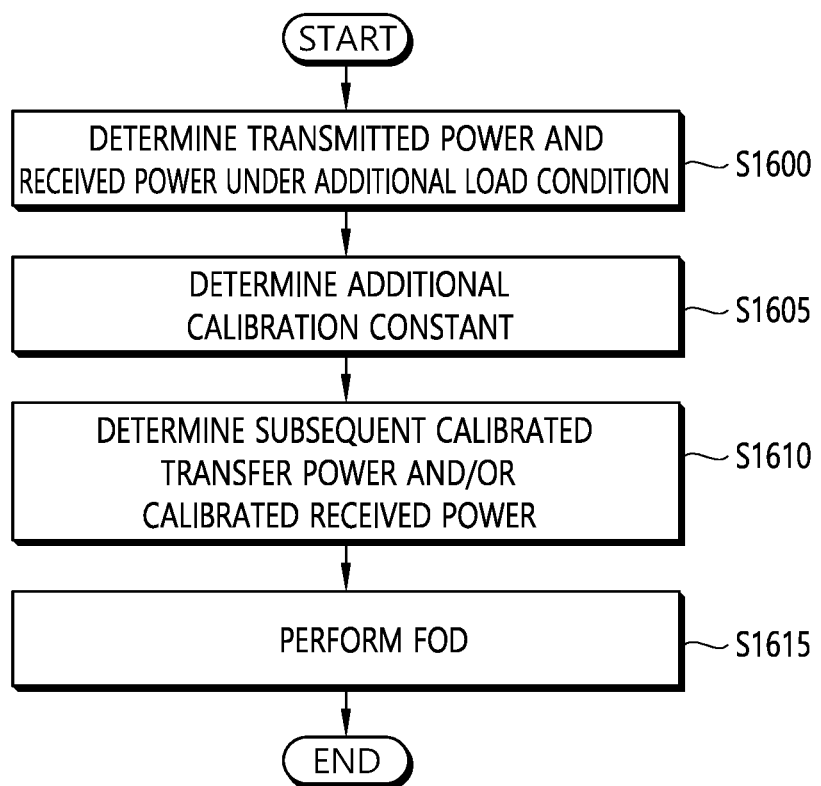
FIG. 16 is a flowchart illustrating a method for performing subsequent calibration in a wireless power transmitter according to an embodiment.

FIG. 16 is a flowchart illustrating a method for performing subsequent calibration of a power transmitter in a wireless power transmitter according to an embodiment.

Referring to FIG. 16, the wireless power transmitter determines the power parameter (transmitted power and/or received power) under the additional connected load condition (S1600). The additional connected load condition means a load condition in a state (or state in which a rectified voltage is increased) in which the connected load of the wireless power receiver increases in the power transfer phase. The transmitted power under the additional connected load condition corresponds to the information already known as the power (Ptransmitted) transmitted by the wireless power transmitter in the power transfer phase. The received power under the additional connected load condition may be determined as the received power value (Preceived) included in the second received power packet received in step S1515.

The wireless power transmitter determines a subsequent calibration constant based on the initial calibration constant (obtained by step S1205), the transmitted power determined under the additional load condition, and the received power (S1605).

Specifically, the wireless power transmitter may determine the subsequent calibration constant by applying the linear interpolation to the determined transmitted power and/or received power, and determine the calibrated transmitted power and/or received power.

When the transmitted power and the received power determined under the additional load condition are x' and y', respectively, coordinates (x' and y') are obtained. When the calibration function (or calibration curve) obtained under the initial load condition extends from the coordinates (x' and y') by the linear interpolation, it is as shown in FIG. 17.

Figure 17:
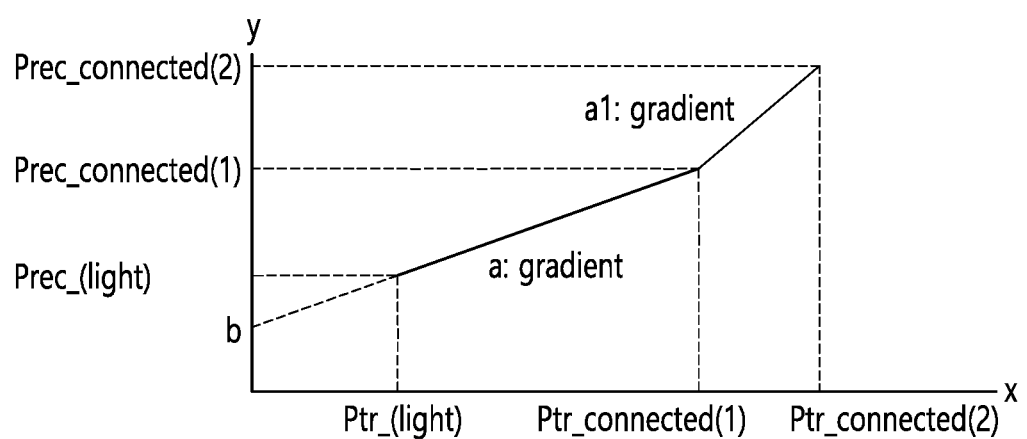
FIG. 17 is a diagram illustrating an extended calibration curve based on linear interpolation according to an embodiment.

FIG. 17 is a diagram illustrating the extended calibration curve based on the linear interpolation according to an embodiment.

Referring to FIG. 17, when a first coordinate composed of transmitted power (Ptr_(light)) and received power (Prec_(light)) under the light load condition in the calibration phase and a second coordinate composed of transmitted power (Ptr_connected (1)) and received power (Prece_connected (1)) under the connected load condition in the calibration phase are connected to each other by the linear interpolation, a linear curve whose a gradient is a and a y-axis offset is b is derived. Here, a may be called a first calibration constant, and b may be called a second calibration constant. This is the same as the calibration curve illustrated in FIG. 14.

Meanwhile, when the second coordinate of the calibration curve in FIG. 14 and the third coordinate composed of transmitted power(Ptr_connected(2)) and received power (Prec_connected(2)) under the additional connected load condition in the power transfer phase are connected to each other by the linear interpolation, the calibration curve of FIG. 14 is extended, and an extended calibration function with a gradient al is obtained.

Even if the transmitted power and/or the received power increases due to the increase in load, the calibration curve is also adaptively extended by a section of Ptr_connected(1) to Ptr_connected(2), the range in which the transmitted power and/or the received power can be calibrated increases, and as a result, the sophisticated FOD can be performed.

The present embodiment relates to the calibration using three coordinates according to three load conditions (power under light load condition in the calibration phase, power under the connected load conditions in the calibration phase, and power under the connected load condition in the power transfer phase), which may be called 3 point calibration or multi-point calibration. In addition, the present embodiment uses the linear interpolation in obtaining the calibration constant, but the interpolation method is not limited thereto.

In order to derive the extended calibration function, the wireless power transmitter should store the calibration constants according to the initial calibration function already derived in the calibration phase in an internal memory. The wireless power transmitter updates the previously stored initial calibration function with the extended calibration function.

Referring back to FIG. 16, when the additional calibration constants are determined as described above, the wireless power transmitter determines the transmitted power in the power transfer phase and receives the received power packet from the wireless power receiver. At this time, the wireless power transmitter determines the calibrated transmit power and/or received power by performing the subsequent calibration on the transmitted power and/or the received power determined in the power transfer phase using the extended calibration function (S1610).

The method of determining the transmitted power calibrated according to the extended calibration function may be adaptively determined according to which section the transmitted power belongs. For example, when the transmitted power is a section of Ptr_connected(1) or lower, the wireless power transmitter may determine the calibrated transmitted power by applying the gradient a, and when the transmitted power is a section of Ptr_connected(1) or higher, the wireless power transmitter may determine the calibrated transmitted power by applying the gradient al.

When the subsequent calibrated transmitted power and/or received power is determined, the wireless power transmitter determines the power loss based on the subsequent calibrated transmitted power and/or received power, and performs the FOD based on the determined power loss (S1615). The wireless power transmitter may perform i) the FOD based on the calibrated transmitted power and the uncalibrated received power, perform ii) the FOD based on the uncalibrated transmitted power and the calibrated received power, and perform iii) the FOD based on the calibrated transmitted power and the calibrated received power.

If the determined power loss exceeds a threshold, the wireless power transmitter may determine that foreign objects exist and stop power transfer. On the other hand, if the determined power loss does not exceed the threshold, the wireless power transmitter may determine that the foreign objects do not exist and continue the power transfer.

The wireless power transmitter in the embodiment according to FIGS. 16 and 17 corresponds to the wireless power transfer device, the wireless power transmitter, or the power transmitting unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, an operation of determining the transmit power and/or the received power under the additional load condition according to step S1600, an operation of determining the additional calibration constant (or calibration curve or calibration function) according to step S1605, an operation of determining the subsequent calibrated transmit power and/or the subsequent calibrated received power according to step S1610, and an operation of performing the FOD according to step S1615 may be performed by the communication/control unit 120.

In addition, the wireless power receiver in the embodiment according to FIGS. 16 and 17 corresponds to the wireless power receiving device, the wireless power receiver, or the power receiving unit disclosed in FIGS. 1 to 11. Accordingly, the operation of the wireless power transmitter in the present embodiment is implemented by one or two or more combinations of each component of the wireless power receiver in FIGS. 1 to 11. For example, in the present embodiment, the operation of generating the received power packet to the wireless power transmitter according to step S1610 may be performed by the power conversion unit 220.

The subsequent calibration according to the load increase event is performed in the power transfer phase without returning to the ping phase, and is contrasted with the subsequent calibration according to the coupling change event returning to the ping phase.

The subsequent calibration according to the embodiment of step S1525 and FIG. 16 may be performed whenever the trigger event occurs during the power transfer phase. For example, each time the received power value in the power transfer phase becomes larger than the received power value in the existing connected load mode, the wireless power transmitter and the wireless power receiver perform the subsequent calibration according to step S1525 and the embodiment of FIG. 16.

Subsequent Calibration According to Coupling Change

As an example, when the coupling change event occurs, the subsequent calibration in the form of redoing the initial calibration may be performed. For example, after the calibration phase, the location of the wireless power receiver may be changed by the user's intention or may be changed regardless of the user's intention. The change of the position of the wireless power receiver eventually causes the coupling change between the wireless power transmitter and the receiver. When the coupling is changed, the initial calibration function (or initial calibration curve) is no longer effective because the initial calibration function derived from the power at the light load/connected load depends on the specific coupling condition. In other words, the initial calibration function derived under the specific coupling condition is no longer effective when the coupling condition is changed.

Accordingly, when the coupling change event occurs, the subsequent calibration includes a process of deriving a substantially new initial calibration function because the existing initial calibration function can no longer be used.

Hereinafter, the method of detecting the occurrence of the coupling change event and the method of performing the power calibration according to the coupling change event will be described in more detail. FIG. 15 illustrates a flowchart of the method for performing power calibration according to the present embodiment.

Figure 18:
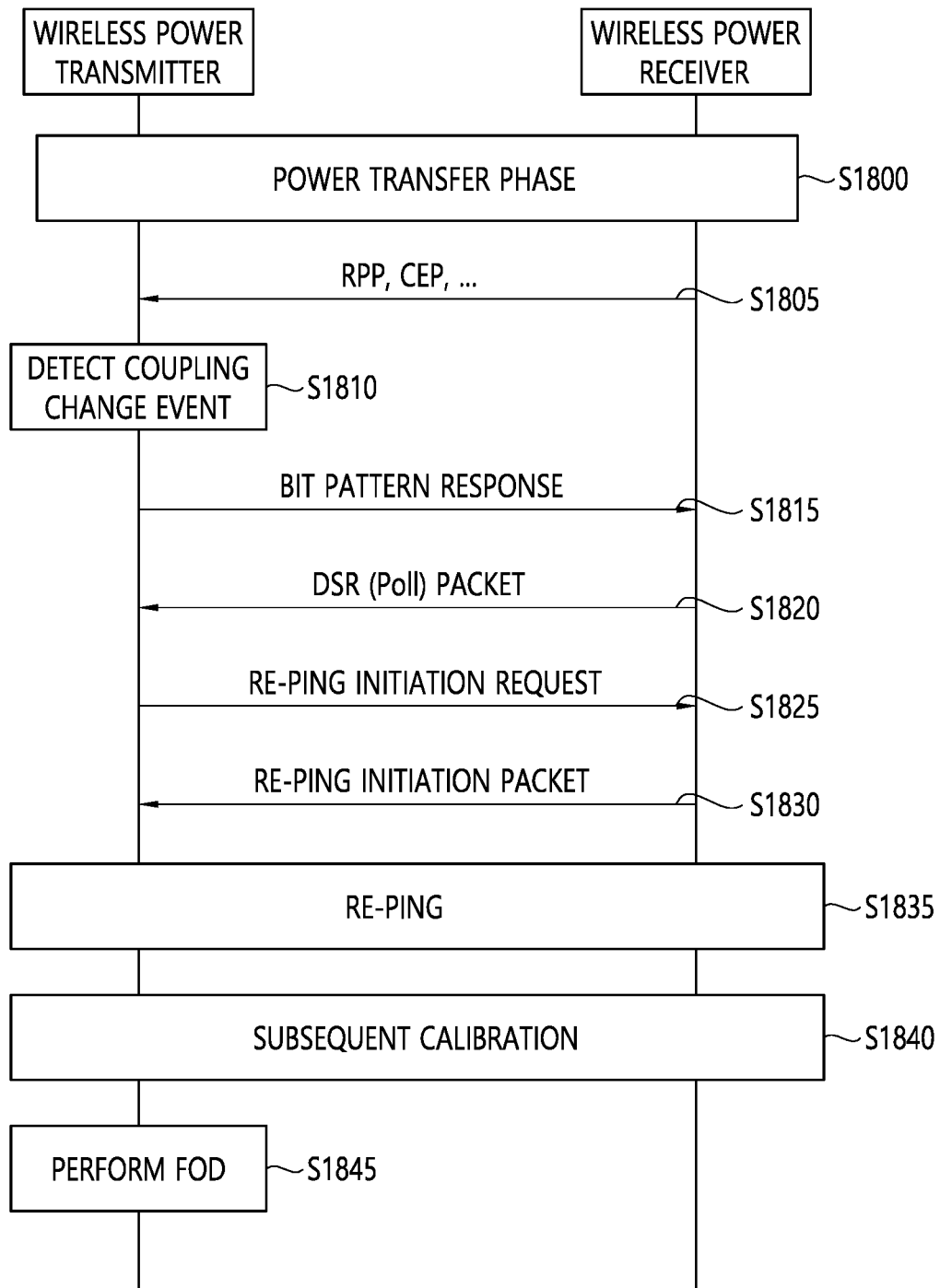
FIG. 18 is a flowchart illustrating a method for performing power calibration based on a coupling change event according to an embodiment.

FIG. 18 is a flowchart illustrating a method for performing power calibration based on a coupling change event according to an embodiment. The method for performing power calibration according to the present embodiment may be performed in the calibration phase of FIG. 5. The power calibration in the present embodiment may include calibrating power parameters (transmitted power and/or received power).

Referring to FIG. 18, the wireless power transmitter transmits the wireless power to the wireless power receiver in the power transfer phase (S1800). In the power transfer phase, the wireless power receiver transmits the first received power packet (RPP), the control error packet (CEP), and the like in the form of FIG. 13 to the wireless power transmitter (S1805).

The wireless power transmitter monitors information on power transmitted in the power transfer phase and/or information (or packet) received from the wireless power receiver, and detects the occurrence of a coupling change event based on the monitoring result. (S1810).

As an example, when the transmitted power (Ptransmitted) is increased even though there is no increase in received power, the wireless power transmitter may determine that the coupling change event occurs or that foreign objects are inserted.

As another example, after the control error (CE) converges to almost 0, when the CE is sharply changed despite no intentional load change in the wireless power receiver, the wireless power transmitter may determine that the coupling change event occurs or the foreign objects are inserted. At this time, the wireless power transmitter can check whether the change in CE is due to a change in the intentional load condition of the wireless power receiver based on the mode field of the received power packet (RPP). That is, the wireless power transmitter may determine whether the coupling change event occurs based on the CEP and the RPP.

When the coupling change event (or insertion of foreign objects) is detected in step S1810, the wireless power transmitter performs the entire FOD procedure again (Q factor-based FOD and APLD) to detect the foreign objects or perform the subsequent calibration. Here, the subsequent calibration includes an operation of renewing the calibration function (or calibration curve or calibration constant) according to the initial calibration again.

The wireless power transmitter may perform an operation of transmitting a specific bit pattern response to the wireless power receiver in response to the received power packet received in step S1805 to inform the wireless power receiver that a coupling change event occurs (S1815). FSK modulation can be used for transmission of the bit pattern response. For example, the bit pattern response is 8 bits and may be called attention (ATN) or request for communication (RFC). The wireless power transmitter sets the bit pattern response to a specific bit value and transmits the specific bit value to the wireless power receiver to request the wireless power receiver to transmit the re-ping initiation packet, draw attention of the wireless power receiver, request transmission of a specific packet, or provide a response to the packet received from the wireless power receiver.

As an example, an ACK response indicating the request approval is represented by a bit pattern of '11111111', a NAK response rejecting the request is represented by a bit pattern of '00000000', and ND indicating that the request is unrecognizable or ineffective may be represented by a bit pattern of '01010101'. In addition, the ATN may be defined as various 8-bit sized bit patterns except for the bit pattern defined for the above ACK/NAK/ND response. For example, the ATN may be defined as '00001111', '11110000', '10101010', '10110110', '00110011' or '01001001'. However, this is only an example, and it is needless to say that the ATN may be configured with various bit patterns.

Since the ATN bit pattern response generally informs the wireless power receiver that there is a message to be transmitted by the wireless power transmitter, the wireless power receiver receives the ATN bit pattern response, and then, for some reason, the wireless power transmitter transmits a DSR (poll) packet to the wireless power transmitter to determine whether the wireless power pattern transmits the ATN bit pattern response (S1820).

At this time, the wireless power transmitter requests the wireless power receiver to transmit a packet for initiating re-ping (hereinafter referred to as a re-ping initiation packet) in response to the DSR (poll) packet (S1825). Step S1825 corresponds to the operation requested by the wireless power transmitter to the wireless power receiver so that the wireless power receiver initiates the re-ping. Since the initiator of the re-ping is the wireless power receiver, the wireless power transmitter cannot enter the re-ping phase arbitrarily without the permission of the wireless power receiver, and therefore, as in step S1825, a process of requesting the wireless power receiver that is the initiator of the re-ping to initiate the re-ping preemptively performed.

The wireless power receiver that is requested to initiate the re-ping generates the re-ping initiation packet and transmits the generated re-ping initiation packet to the wireless power transmitter (S1830). Here, the re-ping initiation packet may be the end power transfer (EPT) packet for initiating the re-ping.

FIG. 19 is a structural diagram illustrating an EPT packet for initiating re-ping according to an embodiment.

Referring to FIG. 19, the EPT packet indicates an EPT code of 1 byte (8 bits). The EPT code can indicate various contents according to the bit value. In particular, when the bit value is '0x0C', the end of power transfer for initiating the re-ping may be indicated. '0x0C' is only an example, and the bit value indicating the termination of the power transmission for initiating the re-ping may include various embodiments such as '0x0D'.

Referring back to FIG. 18, the wireless power transmitter receiving the EPT packet for initiating the re-ping performs the re-ping (S1835). The re-ping may be performed after a specific predetermined re-ping delay. At this time, the re-ping delay value may be set, for example, by the re-ping time (or delay) packet in the negotiation phase. Alternatively, the re-ping may be performed immediately despite the specific predetermined re-ping delay. On the other hand, during the process of performing the re-ping, even if the wireless power is not supplied to the wireless power receiver, the wireless power receiver may indicate that it is charging on the user interface. If the wireless power transmitter fails to receive the re-ping initiation packet within a certain time in step S1830, the wireless power transmitter may reset the wireless power receiver and perform the entire FOD procedure again.

The re-ping may include transmitting, by the wireless power transmitter, in analog ping signal in the selecting step, detecting and identifying the wireless power receiver (at this time, a beep signal indicating detection/identification may be output), and performing the FOD based on a Q factor.

Then, the wireless power transmitter and the receiver perform the subsequent calibration (S1840). The subsequent calibration according to step S1840 may include the initial calibration described in the embodiment of FIG. 12. That is, the subsequent calibration of the wireless power transmitter according to step S1840 includes the calibration operation of the wireless power transmitter according to the embodiment of FIG. 12, and the subsequent calibration of the wireless power transmitter according to step S1840 includes the calibration operation of the wireless power receiver according to the embodiment of FIG. 12. Accordingly, the subsequent calibration according to the coupling change event is completed, and the transmitted power and/or the calibrated received power according to the subsequent calibration are determined.

The wireless power transmitter determines the power loss based on the transmitted power and/or received power determined by the subsequent calibration, and performs the FOD based on the determined power loss (S1845).

The wireless power transmitter in the embodiment according to FIG. 18 corresponds to the wireless power transfer device, the wireless power transmitter, or the power transmitting unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, the operation of transmitting the wireless power to the wireless power receiver in the power transfer phase according to step S1800 may be performed by the power conversion unit 110. In addition, an operation of receiving the RPP, the CEP, and the like according to step S1805, an operation of detecting the coupling change event according to step S1810, an operation of requesting the initiation of the re-ping according to step S1825, an operation of receiving the re-ping initiation packet according to step S1830, an operation of performing the re-ping according to step S1835, an operation of performing the subsequent calibration according to step S1840, and an operation of performing the FOD according to step S1845 may be performed by the communication/control unit 120.

In addition, the wireless power receiver in the embodiment according to FIG. 18 corresponds to the wireless power receiving device, the wireless power receiver, or the power receiving unit disclosed in FIGS. 1 to 11. Accordingly, the operation of the wireless power transmitter in the present embodiment is implemented by one or two or more combinations of each component of the wireless power receiver in FIGS. 1 to 11. For example, in the present embodiment, the operation of receiving the wireless power from the wireless power transmitter in the power transfer phase according to step S1800 may be performed by the power pickup unit 210. In addition, an operation of generating and transmitting the packets of the RPP, the CEP, and the like according to step S1805, an operation of detecting the coupling change event according to step S1810, an operation of receiving the re-ping initiation request according to step S1825, an operation of generating and transmitting the re-ping initiation packet according to step S1830, an operation of performing the re-ping according to step S1835, and an operation of performing the subsequent calibration according to step S1840 may be performed by the communication/control unit 220.

The method for performing power calibration according to FIG. 18 is an example when the wireless power receiver is the initiator of the re-ping. However, for the immediate re-ping, the wireless power transmitter may be the initiator of the re-ping. Accordingly, hereinafter, the method for performing power calibration in the case where the initiator of the re-ping is the wireless power transmitter is disclosed.

Figure 20:
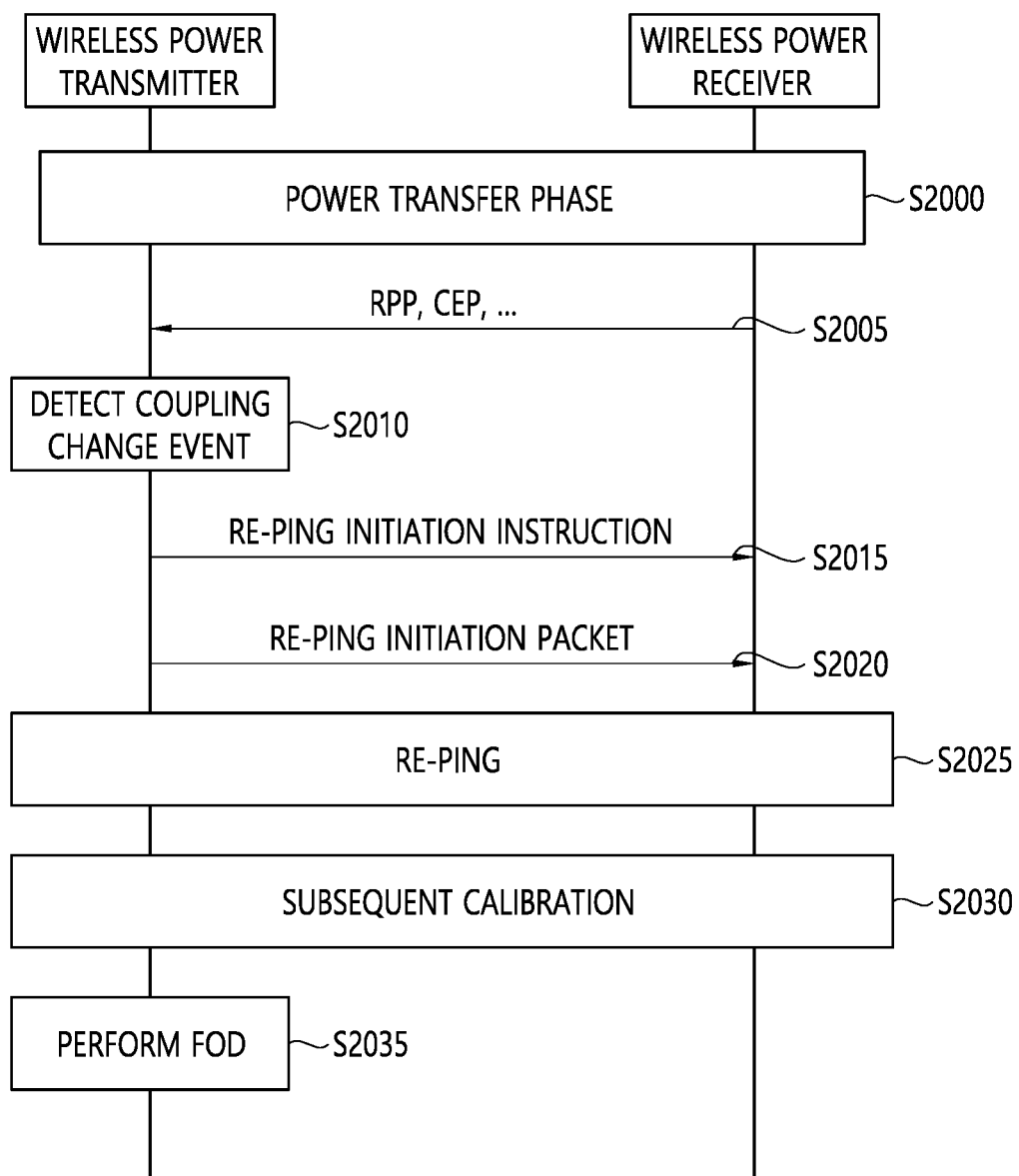
FIG. 20 is a flowchart illustrating a method for performing power calibration based on a coupling change event according to another embodiment.

FIG. 20 is a flowchart illustrating a method for performing power calibration based on a coupling change event according to another embodiment. The method for performing power calibration according to the present embodiment may be performed in the calibration phase of FIG. 5. The power calibration in the present embodiment may include the calibration of the transmitted power and the calibration of the received power.

Referring to FIG. 20, steps S2000 to S2010 are the same as steps S1800 to S1810, respectively. However, in the embodiment of FIG. 20, since the wireless power transmitter is the initiator of the re-ping, the wireless power transmitter notifies the re-ping initiation in a bit pattern instead of transmitting the re-ping initiation request to the wireless power receiver as in step S1815 (S2015). In addition, the wireless power transmitter may transmit the re-ping initiation packet to the wireless power receiver (S2020), and may enter the re-ping step unilaterally (S2025). At this time, the re-ping initiation packet in step S2020 may have a packet structure including, as, for example, 1 byte (8 bits), a first field of 2 bits indicating whether to perform the re-ping and a second field of 2 bits indicating the re-ping delay time. Of course, the number of bits included in the first field and the second field may be variously modified.

Thereafter, steps S2025 to S2035 are the same as steps S1825 to S1835, respectively.

The wireless power transmitter in the embodiment according to FIG. 20 corresponds to the wireless power transfer device, the wireless power transmitter, or the power transmitting unit disclosed in FIGS. 1 to 11. Accordingly, the operation of the wireless power transmitter in the present embodiment is implemented by one or two or more combinations of each component of the wireless power transmitter in FIGS. 1 to 11. For example, in the present embodiment, the operation of transmitting the wireless power to the wireless power receiver in the power transfer phase according to step S2000 may be performed by the power conversion unit 110. In addition, an operation of receiving the RPP, the CEP, and the like according to step S2005, an operation of detecting the coupling change event according to step S2010, an operation of generating and transmitting the re-ping initiation instruction according to step S2015, an operation of transmitting the re-ping initiation packet according to step S2020, an operation of performing the re-ping according to step S2025, an operation of performing the subsequent calibration according to step S2030, and an operation of performing the FOD according to step S2035 may be performed by the communication/control unit 120.

In addition, the wireless power receiver in the embodiment according to FIG. 20 corresponds to the wireless power receiving device, the wireless power receiver, or the power receiving unit disclosed in FIGS. 1 to 11. Accordingly, the operation of the wireless power transmitter in the present embodiment is implemented by one or two or more combinations of each component of the wireless power receiver in FIGS. 1 to 11. For example, in the present embodiment, the operation of receiving the wireless power from the wireless power transmitter in the power transfer phase according to step S2000 may be performed by the power pickup unit 210. In addition, an operation of generating and transmitting the packets of the RPP, the CEP, and the like according to step S2005, an operation of detecting the coupling change event according to step S2010, an operation of receiving the re-ping initiation instruction according to step S2015, an operation of receiving the re-ping initiation packet according to step S2020, an operation of performing the re-ping according to step S2025, and an operation of performing the subsequent calibration according to step S2030 may be performed by the communication/control unit 220.

The subsequent calibration according to the embodiment of step S1840 or step S2030 and FIG. 16 may be performed whenever the trigger event occurs during the power transfer phase. For example, each time the coupling change event occurs, the wireless power transmitter and the wireless power receiver may perform the subsequent calibration according to the embodiment of step S1840 or step S2030.

In a wireless power transmitting method and device or receiving device and method according to embodiments of this specification, because all components or steps are not essential, the wireless power transmitting device and method or receiving device and method may be performed by including some or all of the above-described components or steps. Further, embodiments of the wireless power transmitting device and method or receiving device and method may be performed in combination. Further, it is not necessary that the above components or steps should be performed in the described order, and a step described later may be performed prior to a step described earlier.

The foregoing description is merely illustrative of the technical idea of this specification, and various changes and modifications may be made by those skilled in the art without departing from the essential characteristics of this specification. Therefore, the foregoing embodiments of this specification can be implemented separately or in combination.

Therefore, the embodiments disclosed in this specification are intended to illustrate rather than to limit the scope of this specification, and the scope of the technical idea of this specification is not limited by these embodiments. The scope of protection of this specification should be construed according to the following claims, and all technical ideas within the scope of equivalents to claims should be construed as falling within the scope of this specification.

What is claimed is:

1. A wireless power transmitter, comprising:
 a power conversion unit configured to transmit wireless power generated based on magnetic coupling to a wireless power receiver in a power transfer phase; and
 a communication/control unit configured to:
 receive, from the wireless power receiver, a first received power packet informing a first received power value for power calibration,
 receive, from the wireless power receiver, a second received power packet informing a second received power value for power calibration,
 receive, from the wireless power receiver, a subsequent second received power packet informing a third received power value for power calibration, perform calibration for a power parameter using at least one of the first received power packet, the second received power packet, or the subsequent second received power packet, and perform a detection of a foreign object using a power loss determined using the power parameter subjected to the calibration.

2. The wireless power transmitter of claim 1, wherein the communication/control unit receives the subsequent second received power packet from the wireless power receiver during the power transfer phase.

3. The wireless power transmitter of claim 1, wherein the second received power value and the third received power value are close to maximum power.

4. The wireless power transmitter of claim 1, wherein the communication/control unit transmits a bit pattern requesting an initiation of re-ping to the wireless power receiver based on the change in the magnetic coupling.

5. The wireless power transmitter of claim 4, wherein the communication/control unit receives a re-ping initiation packet from the wireless power receiver in response to the bit pattern.

6. The wireless power transmitter of claim 5, wherein the re-ping initiation packet includes an end power transfer (EPT) packet for initiating the re-ping.

7. The wireless power transmitter of claim 1, wherein the second received power packet and the subsequent second received power packet have a same mode field value.

8. A power calibration method by a wireless power transmitter, comprising:

receiving, from a wireless power receiver receiving wireless power from the wireless power transmitter, a first received power packet informing a first received power value for power calibration, receiving, from the wireless power receiver, a second received power packet informing a second received power value for power calibration, receiving, from the wireless power receiver, a subsequent second received power packet informing a third received power value for power calibration, performing calibration for a power parameter using at least one of the first received power packet the second received power packet, or the subsequent second received power packet.

9. The power calibration method of claim 8, wherein the second received power value and the third received power value are close to maximum power.

10. The power calibration method of claim 8, wherein the second received power packet and the subsequent second received power packet have a same mode field value.

11. A method for detecting a foreign object by a wireless power transmitter, comprising:

receiving, from a wireless power receiver receiving wireless power from the wireless power transmitter, a first received power packet informing a first received power value for power calibration, receiving, from the wireless power receiver, a second received power packet informing a second received power value for power calibration, receiving, from the wireless power receiver, a subsequent second received power packet informing a third received power value for power calibration, performing calibration for a power parameter using at least one of the first received power packet, the second received power packet, or the subsequent second received power packet, and performing the detection of the foreign object using a power loss determined using the power parameter subjected to the calibration.

12. The method of claim 11, wherein the second received power value and the third received power value are close to maximum power.

13. The method of claim 11, wherein the second received power packet and the subsequent second received power packet have a same mode field value.

* * * * *